(12) United States Patent
Goehler

(10) Patent No.: US 12,722,947 B2
(45) Date of Patent: Sep. 1, 2026

(54) PET ANIMAL LIFT

(71) Applicant: Deirdre Goehler, Prairie Village, KS (US)

(72) Inventor: Deirdre Goehler, Prairie Village, KS (US)

( * ) Notice: Subject to any disclaimer, the term of this patent is extended or adjusted under 35 U.S.C. 154(b) by 0 days.

(21) Appl. No.: 19/040,590

(22) Filed: Jan. 29, 2025

(65) Prior Publication Data

US 2026/0217503 A1 Jul. 30, 2026

(51) Int. Cl.
*B66F 3/22* (2006.01)
*A01K 29/00* (2006.01)

(52) U.S. Cl.
CPC ................ *B66F 3/22* (2013.01); *A01K 29/00* (2013.01)

(58) Field of Classification Search
CPC ................................. B66F 3/22; A01K 29/00
See application file for complete search history.

(56) References Cited

U.S. PATENT DOCUMENTS 3,806,092 A * 4/1974 Richards .................. B66F 7/08 D34/28
RE28,455 E * 7/1975 Denier ...................... B66F 3/22 182/69.5
4,488,326 A * 12/1984 Cherry ...................... B66F 7/28 14/72.5
5,105,915 A * 4/1992 Gary ......................... B66F 7/08 14/71.3

FOREIGN PATENT DOCUMENTS

CN 116924300 A * 10/2023 ............ B66F 17/006

OTHER PUBLICATIONS

Machine Translation of CN 116924300.*

* cited by examiner

*Primary Examiner* — Diem M Tran
(74) *Attorney, Agent, or Firm* — Invention Protection Associates, LLC

(57) ABSTRACT

A lift apparatus for elevating pet animals from the floor to a higher surface such as a bed or couch, and vice versa, without human carrying or exertion.

19 Claims, 2 Drawing Sheets

16
22
12
10
26
30
40

10
14
20
22
24
26
30
40

PET ANIMAL LIFT

BACKGROUND OF THE INVENTION

The present invention generally relates to lifting devices, and it is specifically directed to a lifting device that is adapted to vertically raise and lower dogs—typically, so that they can travel from the floor onto their pet owner's beds, and vice versa, without the pet owner physically lifting the pet or the pet jumping or using the aid of ramps or stepped apparatuses. The invention is further directed to such a lifting device that is compactible and transportable relative to such ramps or stepped devices often used by pet owners to get their pets onto furniture or into vehicles.

Certainly in modern America, it is quite common that domestic dog owners routinely share their sleeping beds with their canine pets. Depending on various factors such as the mattress height of a pet owner's bed, a dog's ability to comfortably leap from floor-to-bed, and the type and arrangement of any furniture that may be adjacent to a bed, a dog owner may have to manually lift and place its dog onto the bed each evening and any other time that the dog is to be elevated onto the bed. Not only can that become a tedious task, it can be a daunting proposition for a physically injured or otherwise limited dog owner and/or when a relatively large and heavy dog is concerned. Moreover, for dogs that may be especially susceptible to back injury (such as is the case with many aging dogs of the dachshund breed type), the notion of them being manually gathered and lifted with somewhat unpredictable human motion mechanics can be a hazardous one for the dog.

Consequently, in some instances, dog owners place other furniture pieces having intermediate height platforms (e.g., chaise lounge chairs) adjacent their beds so that their dog can jump from floor to intermediate furniture piece to bed. In other instances, dog owners will obtain and place a stepped apparatus or a ramp next to the bed. However, all of those potential solutions may be aesthetically unappealing or practically unviable from a space organization perspective in many cases. And the unviability may be even more pronounced considering that those objects—be they furniture pieces or designed for pet elevation—may need to be repeatedly repositioned away from and back toward a bed to alternatively permit the dog owner and dog to comfortably exit and return onto the bed, respectively.

Therefore, the present inventor has invented a lift device that is designed specifically for enabling a pet animal to be raised onto and lowered from human beds in a manner that is physically safe for both the owner and the animal, and she has further designed that lift device to be easily movable, when desired, and compactible so that the device can be moved away from its use position without undue labor, and can be efficiently stowed and traveled with.

SUMMARY OF THE INVENTION

It is an object of the present invention to provide a pet animal lift apparatus configured so that a pet animal walking on the floor may safely step onto it, be lifted to an elevated position, and safely step off it and onto the surface of a bed mattress, sofa cushion, or the like. In one aspect of the inventive lift apparatus, it features a carrier formed by a horizontal platform and vertical retaining walls that extend up from much of, but not all, the perimeter of the platform (e.g., from 3 of the 4 edges of a rectangular platform or from at least a 270-degree perimeter of a circular platform). Ideally, the carrier is designed to support a pet animal of up to 200 lbs. and moves between: (a) a floor position at which the animal can walk onto the carrier through an opening along the front perimeter portion of the carrier platform (i.e., a lowered retaining wall or non-existent obstruction there); and (b) a fully elevated position at which the animal can exit the rear perimeter portion of the platform—presumably, onto a furniture surface. Ideally, what is to be considered the fully elevated position of the carrier is adjustable, either by mechanical manipulation or by digital input, to enable the carrier platform to be raised to a position that corresponds with the given height of a furniture surface that the animal will step onto upon exiting the lift apparatus.

In another aspect of the invention, the carrier platform perimeter has front and rear portions and opposing side portions, and the retaining walls attached at the perimeter edges of its platform are positioned along those side and front portions, but not along that rear portion. Each retaining wall may repositioned between an erect, vertical orientation and a lowered one by virtue of its accordion, telescoping, or other suitable configuration. Regardless, an additional barrier is situated next to the rear perimeter edge of the platform (i.e., the platform edge that will be positioned nearest the furniture surface that the pet will step onto upon exiting the elevated carrier), but is not directly attached to the carrier platform and, instead, is taller than the retaining walls and remains in fixed position while the carrier is raised and lowered. The height and positioning of this additional barrier is such that it prevents an animal from exiting the rear end of the carrier, except when the carrier is fully elevated. Of course, that rear perimeter height is adjustable to ensure that the top edge of the barrier is positioned at or below the horizontal plane of the carrier platform when the carrier is fully elevated. This allows the pet to safely exit the rear of the platform and onto a furniture surface, or vice versa, while the apparatus carrier is fully elevated.

In yet another aspect of the invention, a horizontal walkway may be formed at the top of the rear barrier element of the apparatus to provide a short path for an animal to walk off of the carrier platform and safely onto a neighboring mattress or cushion surface without needing to step over any gap that might otherwise exist between the rear edge of the carrier and the near edge of that furniture surface. It is anticipated that such a walkway would be configured as, essentially, a platform that extends from next to the carrier platform to onto a furniture surface, and it may be pivotally attached to the apparatus so that its rearward end comfortably rests atop the furniture surface when the apparatus's carrier platform and top of its rear barrier are positioned even slightly above height of the furniture surface that it is bridging to.

It is another object of the present invention to provide a pet animal lift apparatus with remotely and/or automatically controlled lifting and lowering action. In an aspect of the invention, the apparatus features a rechargeable battery-powered lifting mechanism configured to raise and lower the carrier in response to a user's real-time commands or in response to weight moving onto the carrier according to pre-programming. For example, a remote controller device may be used to actuate upward and downward movement of the carrier—and maybe even on the precondition that the retaining wall along the front edge of the carrier is in its upright position to ensure that the carrier moves upward only when the pet is confined within a fully walled enclosure. For another example, the lifting mechanism can be programmed (at the remote controller device or otherwise) to raise the carrier from its floor position to an elevated position when at least a certain amount of weight (which can be selected to correspond with just below a particular animal's body weight) is placed onto a previously unweighted carrier or to lower the carrier from its fully elevated position (which, itself, can be selected to correspond with height of a bed, sofa, etc.) to its floor position.

It is yet another object of the present lift apparatus to be easily movable across a floor when that is desirable (but not while the apparatus is positioned for use) and compactible for stowing and traveling. In another aspect of the invention, in addition to the carrier retaining walls being lowerable and the rear barrier being at least somewhat vertically retractable to accommodate different "fully elevated" carrier positions, the rear barrier element can be detachable from the rest of the apparatus so that it may be placed in a storage space or luggage compartment in an orientation, relative to the rest of the apparatus, that is different from its installed position.

Furthermore, in yet another aspect of the invention, the lift apparatus can feature wheels and a [removable] handle element for facilitating easy pushing or pulling of the apparatus across a floor. However, the wheels can be selective locked into non-rotating position or withdrawn into a position of non-contact with the ground to prevent the apparatus from inadvertently moving along the floor while positioned for usage.

DETAILED DESCRIPTION OF THE PREFERRED EMBODIMENTS

The present disclosure is especially applicable to lifting devices intended for use with indoor pets. However, broader applications may be well within the scope of the invention. With that understanding, some (but not all) aspects of this disclosure are embodied in accompanying drawings, and they relate to a mechanical device comprising the core elements of a carrier 10 and a lifting mechanism 20—where the carrier 10 is configured to permit [unsupervised] ingress and egress of a four-legged animal and provide safe lateral and undergirding support of such an animal while the carrier is being vertically raised and lowered, and the lifting mechanism 20 is capable of both raising the animal-containing carrier 10 from a floored position at or near the floor to an elevated position at standard bed top height and, subsequently, returning it to the floored position.

Figure 2:
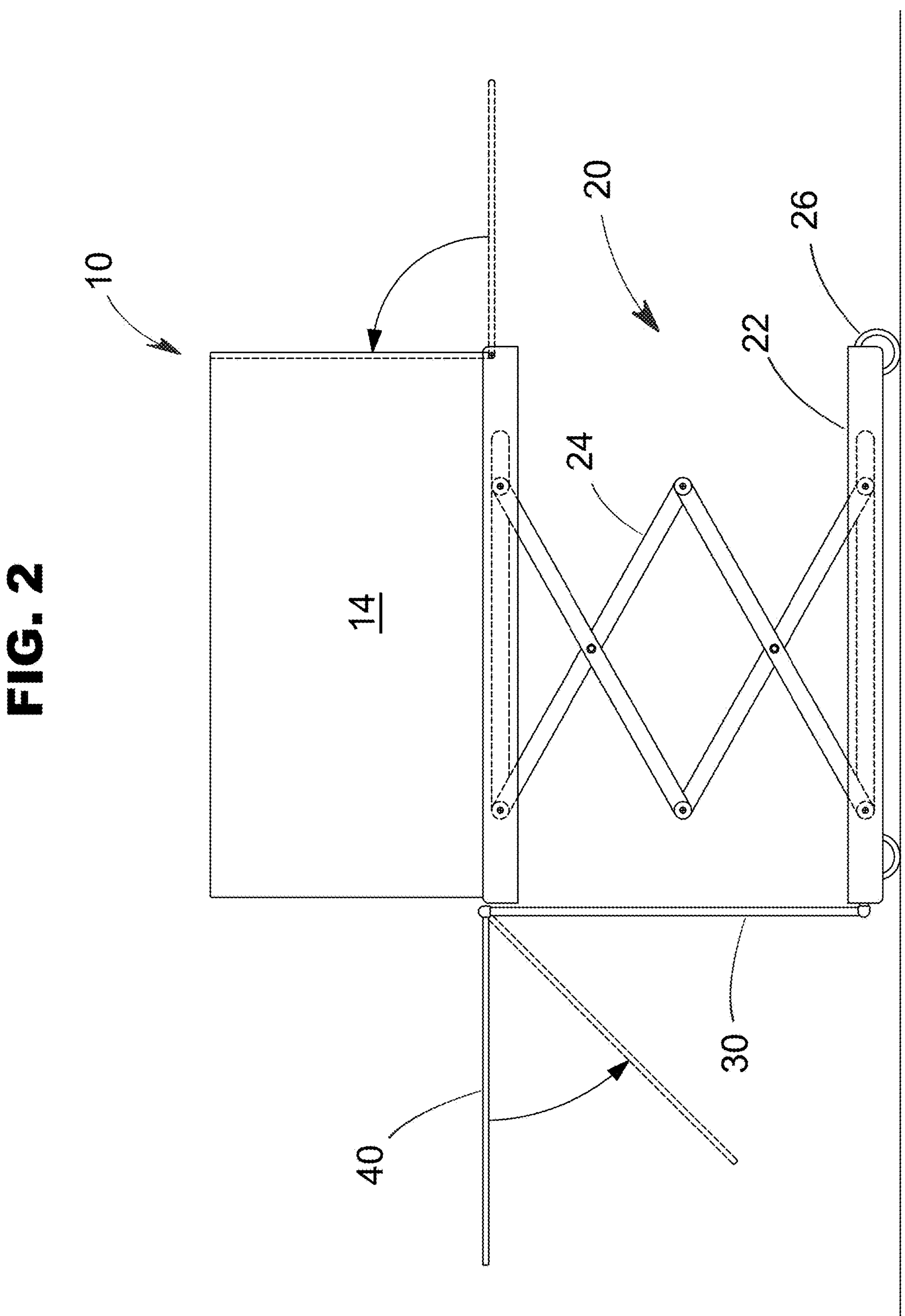
FIG. 2 is another side elevational view of the same, the lift shown with its carrier in fully elevated position—with its retaining walls in upright positions.

In a preferred embodiment of the animal lift of the present invention shown in FIG. 2, a scissor lift-type mechanism 20 having a base 22 and folding supports 24 that the carrier 10 is fixed atop is employed. The lift supports 24 can be actuated by a rechargeable battery-powered motor (not shown) or other suitable means, and the lifting action may be remotely controlled.

The carrier 10 is formed by a horizontal rectangular platform 12 and side retaining walls 14 which extend up from the left and right edges of the platform 12. In this embodiment, a third wall—a front retaining wall 16—is pivotally attached to the platform's front edge to alternately: (a) extend outward from that front edge and function as a floor-to-lift ramp that an animal enters the carrier platform 12 from while the carrier 10 is in floored position; and (b) extend upward from the platform 12 to provide a front retaining wall after the animal has entered the carrier 10. However, other embodiments of the present lift may be devoid of such a wall at the front end of the carrier 10. In any case, the raising and lowering of the carrier's two side retaining walls 14 can be accomplished by virtue of any suitable means of wall configuration (e.g., accordion, telescoping, folding, etc.) and/or by them being pivotally attached to the carrier platform 12 like the floor ramp/front retaining wall 16.

Adjacent the rear end of the carrier 10 should be a barrier, of some sort, that effectively completes a four-sided enclosure of a carrier 10 when its front perimeter retaining wall 16 two side perimeter retaining walls 14 are all upright. In the preferred embodiment shown in FIGS. 1 & 2, this rear barrier 30 is a wall whose bottom edge is attached at the base 22 of the scissor lift 20. The rear barrier 30 is height-adjustable, via its telescoping or other configuration enabling it to be vertically expanded and contracted, so that its height can be set to correspond with the fully raised height of the carrier platform 12 (which, itself, should be adjustable within a range of elevated positions so that it can be set to correspond with the varied heights of different furniture surfaces). In other embodiments of the apparatus, the rear barrier 30 could be formed by a housing containing elements of a forklift or other type of lifting mechanism, and that kind of alternate configuration may enable the carrier platform 12 to be lowered all the way down to floor surface level.

Figure 1:
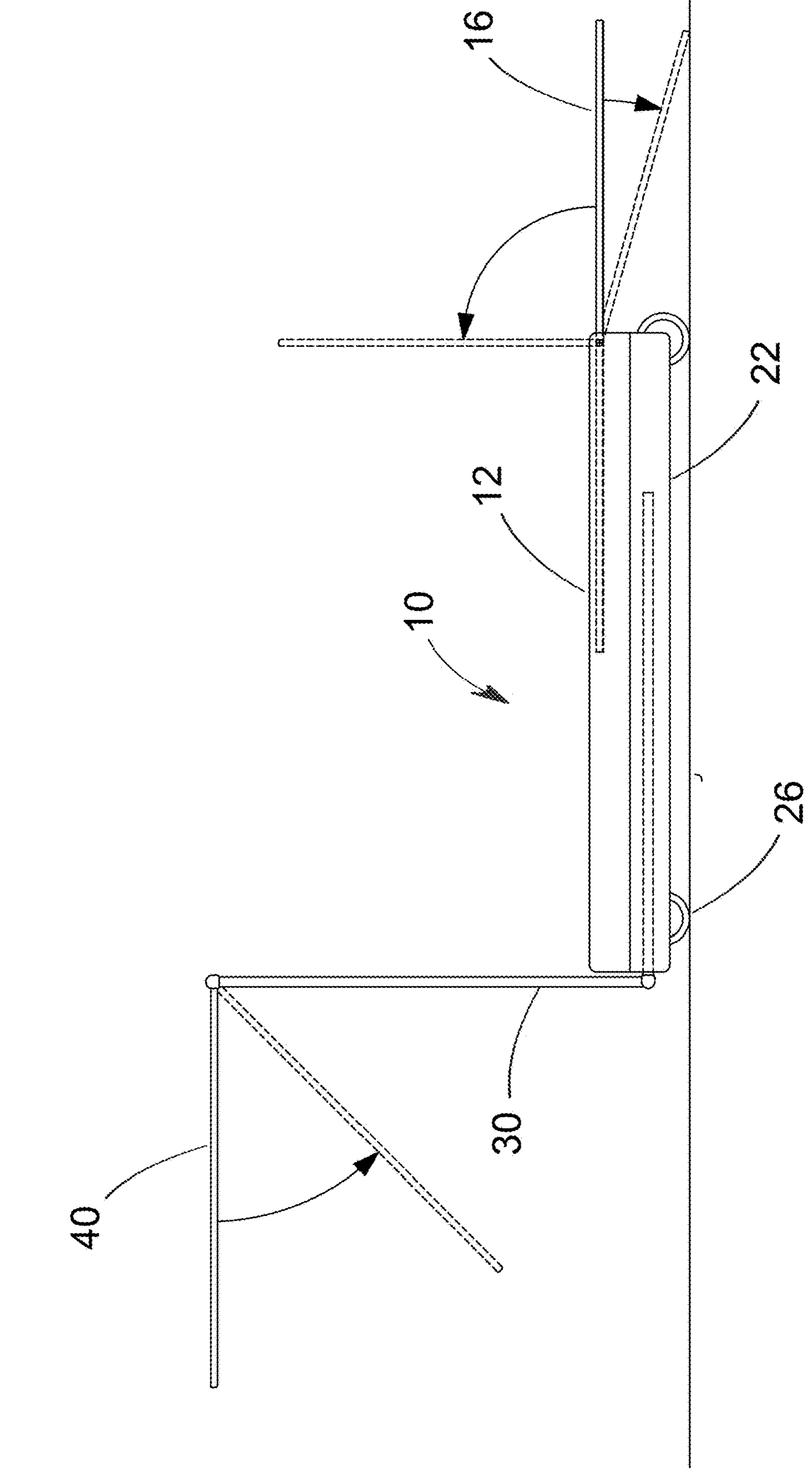
FIG. 1 is a side elevational view of a pet animal lift employing a scissor lifting mechanism in accordance with the present invention, the lift shown with its rear barrier in fully extended upright position and its carrier in floored position—with its side retaining walls lowered and out of view.

Referring back to the preferred embodiment shown in FIG. 1, wheels 26 attached at the base 22 of the lift 20 permit the device to travel along a floor. Furthermore, a handle can be formed by a void positioned toward the upper end of the rear barrier 30 to facilitate pushing or pulling of the device. The wheels 26 should be able to either lock into non-rotation or be withdrawn into the lift base 22 and out of contact with the floor.

As shown in FIGS. 1 & 2, a "bed bridge" platform 40 which extends between the top of the rear barrier 30 and an awaiting furniture surface permits an animal to walk between the fully elevated carrier platform 12 and a furniture surface without having to negotiate any gap between them. In a preferred embodiment, the bed bridge 40 is pivotally attached to the top edge of the rear barrier 30, but it also could be an extraneous piece having pivot hooks that drape and mount over the edge of the rear barrier 30 or other suitable connecting means.

Also, in a preferred embodiment of the apparatus, a weight sensing mechanism and on-board computing device (not shown) are operatively connected to the carrier 10 and lifting mechanism 20 to detect load placed on the carrier 10 and initiate the vertical movements of the carrier 10 (and, conceivably, the upward and downward pivoting of the carrier front retaining wall 16). For example, the computer could be programmed such that when a load greater than a threshold amount (presumably, corresponding to the known weight of an animal expected to use the device) is placed on the carrier platform 12 while in its floored position, the carrier 10 shall begin elevating—maybe only on the precondition that a given amount of time elapses from the moment that the suitable load is first detected (e.g., 3 seconds). This would provide ample time for an animal to either get comfortably situated within the carrier 10 in anticipation of being lifted or move safely out of the carrier 10 after having just been lowered (without the carrier 10 returning upward while the animal has maybe only partially exited it). Similarly, a version of the carrier 10 can feature a front perimeter retaining wall 16 that is programmed and mechanized to pivot from its upright retainer orientation to a downed ramp orientation upon the carrier 10 returning from an elevated position to its floored position.

Finally, it may be preferred that the apparatus also possesses a drive mechanism that is remotely controlled to propel the entire lift device across a floor surface upon user instruction.

It is understood that substitutions and equivalents for various elements set forth above may be obvious to those skilled in the art and may not represent a departure from the spirit of the invention. Therefore, the full scope and definition of the present invention is to be set forth by the claims that follow.

What is claimed is:

1. A pet animal lift apparatus comprising:
an animal carrier comprising:
a platform having front, rear, and opposing side perimeters; and
side perimeter retaining walls that extend up from the side perimeters of the platform, wherein the side perimeter retaining walls are configured to limit where an animal can enter or exit the carrier;
a rear barrier that extends up to the height of said platform when said platform is fully elevated, wherein the rear barrier is not directly attached to the carrier, but is adjacent the rear perimeter of the platform and is configured to inhibit an animal from exiting the rear perimeter of the platform while the platform is below its fully elevated position; and
a lifting mechanism capable of raising and lowering the carrier between a floored position defined by the platform being at or near floor level and a range of elevated positions.

2. The pet animal lift apparatus of claim 1, wherein said rear barrier has an adjustable height.

3. The pet animal lift apparatus of claim 1, further comprising a front perimeter retaining wall that extends up from the front perimeter of the platform, wherein this front perimeter retaining wall is lowerable to permit front perimeter entry of an animal onto said platform.

4. The pet animal lift apparatus of claim 1, wherein said lifting mechanism is powered by a rechargeable battery.

5. The pet animal lift apparatus of claim 1, wherein operation of said lifting mechanism is remotely controllable.

6. The pet animal lift apparatus of claim 1, further comprising wheels and a handle for advancing the lift apparatus along a floor.

7. The pet animal lift apparatus of claim 1, further comprising wheels, and wherein said rear barrier forms a handle for pulling or pushing the lift apparatus along a floor.

8. The pet animal lift apparatus of claim 1, wherein said side perimeter retaining walls are lowerable.

9. The pet animal lift apparatus of claim 1, further comprising a bridge for animals to walk along between said platform and a furniture surface while said carrier is fully elevated.

10. The pet animal lift apparatus of claim 1, further comprising a drive mechanism capable of imparting motion of the apparatus along a floor.

11. The pet animal lift apparatus of claim 1, further comprising a weight sensing mechanism configured to sense the weight of a load on the platform.

12. The pet animal lift apparatus of claim 11, wherein said carrier moves vertically in response to said weight sensing mechanism sensing at least a threshold weight.

13. A pet animal lift apparatus comprising:
an animal carrier comprising:
a platform having front, rear, and opposing side perimeters; and
perimeter retaining walls that extend up from the front and side perimeters of the platform, wherein the perimeter retaining walls are configured to limit where an animal can enter or exit the carrier;
a lifting mechanism capable of raising and lowering the carrier between a floored position defined by the platform being at or near floor level and a range of elevated positions; and
a weight sensing mechanism configured to sense the weight of a load on the platform;
wherein a perimeter retaining wall raises in response to said weight sensing mechanism sensing at least a threshold weight.

14. The pet animal lift apparatus of claim 13, wherein a perimeter retaining wall lowers upon said carrier arriving at the floored position after having been at an elevated position just prior thereto.

15. The pet animal lift apparatus of claim 13, further comprising a bridge for animals to walk along between said platform and a furniture surface while said carrier is fully elevated.

16. The pet animal lift apparatus of claim 13, further comprising a drive mechanism capable of imparting motion of the apparatus along a floor.

17. The pet animal lift apparatus of claim 13, wherein said carrier moves vertically in response to said weight sensing mechanism sensing at least a threshold weight.

18. A pet animal lift apparatus comprising:
an animal carrier comprising:
a platform having front, rear, and opposing side perimeters; and
perimeter retaining walls that extend up from the front and side perimeters of the platform, wherein the perimeter retaining walls are configured to limit where an animal can enter or exit the carrier:
a lifting mechanism capable of raising and lowering the carrier between a floored position defined by the platform being at or near floor level and a range of elevated positions; and
a weight sensing mechanism configured to sense the weight of a load on the platform;
wherein a perimeter retaining wall raises in response to: (1) said weight sensing mechanism sensing at least a threshold weight; and said carrier having remained at the floored position for at least a threshold amount of time.

19. The pet animal lift apparatus of claim 18, wherein said carrier moves vertically in response to said weight sensing mechanism sensing at least a threshold weight.

* * * * *